3,793,399
ANIONIC POLYMERIZATION OF LACTAMS IN THE PRESENCE OF A POLYETHER AND A COMPOUND CONTAINING A UREA, THIOUREA, OR GUANIDINE RADICAL
Jozef L. M. van der Loos, Rijksweg Z 146, and Peter J. M. W. Claassen, Eisenhowerstraat 373, both of Sittard, Netherlands
No Drawing. Filed Sept. 21, 1971, Ser. No. 182,520
Claims priority, application Netherlands, Sept. 23, 1970, 7014022
Int. Cl. C08g 41/04
U.S. Cl. 260—857 PG      2 Claims

ABSTRACT OF THE DISCLOSURE

A process for the preparation of polylactam polymers of improved notch impact strength is described, the process of the anionic catalytic polymerization reaction in the presence of certain promoters being carried out in the further presence of a quantity of a polyether which is soluble in the molten lactam being polymerized.

---

This invention relates to an already known process for the anionic catalytic polymerization of lactams, in which a lactam or a mixture of lactams is polymerized with the aid of a promoter consisting of an organic nitrogen compound comprising at least one hydrocarbon radical having from 3 to 12 carbon atoms being an N-substituent of at least one urea, thiourea or guanidine radical, as are described in U.S. Pat. 3,304,291. Lactams polymerized in this manner generally have from 5 to 12 carbon atoms, the most important species presently being caprolactam.

Though the lactam polymerization products prepared by this known process have a high K-value according to Fikentscher, their notch impact strength (Izod-value) is only moderate.

It has now been found according to the present invention that such polylactams of a distinctly higher notch impact strength can be obtained by carrying out the said known process described above in the presence also of a quantity of a polyether which is soluble in the molten lactam, or mixture of lactams being polymerized.

The addition of as little as 2% by weight of polyether will induce an increase in the notch impact strength of some significance. The Izod-value can even be doubled by adding only modest quantities of polyether, for instance 5 or 10 or 15 or 20% by weight.

The quantity of polyether to be added is however limited to at most about 25% by weight of the quantity of lactam to be polymerized. If larger quantities of polyether are employed, polymerization products are obtained which possess poor mechanical properties.

It is important to note that surprisingly the addition of the polyether according to the invention has no objectionable secondary effects. The rigidity of the polymerization product is decreased relatively little; the crystallinity and the spherulite size are not at all, or only hardly, influenced.

The invention therefore provides a process for the anionic catalytic polymerization of lactams, in which a lactam or a mixture of lactams is polymerized with the aid of a promoter consisting of an organic nitrogen compound comprising at least one hydrocarbon radical having from 3 to 12 carbon atoms being an N-substituent of at least one urea, thiourea or guanidine radical, utilizing the improvement of carrying out the polymerization reaction in the presence of a quantity of a polyether which polyether is soluble in molten lactam.

Examples of polyethers which are soluble in molten lactam and which can be used in the process according to the invention are: polytetrahydrofuran, polyepichlorohydrin, polyglycidyl ethers, polyethylene glycol, polypropylene glycol, copolymers of ethylene glycol and propylene glycol, alkylphenoxy-polyethylene glycol, as well as alkoxyalkyl-phenoxy-polyethylene oxide. In general these are polyethers derived from aliphatically saturated ethers having from two to five carbon atoms and carrying as substituents chlorine, phenoxy, alkylphenoxy, and alkoxyalkyl-phenoxy radicals. These and also other polyethers are soluble in molten lactam, except when they have a very high molecular weight, for example higher than 20,000.

Examples of the known promoters which may be employed in the process according to the invention are: 1,6-bis(capryllactam N-carbonylamine)hexane, 1,6-bis-(caprolactam N-carbonylamine)hexane, 2,4-bis(caprolactam N-carbonylamine)toluene, caprolactam N-carbonylaminobenzene, 1,6-bis(N,N-dibutylureido)hexane, 1,6-bis(pyrrolidone N-carbonylamine)hexane.

It should be noted that it has been proposed to use polyalkene glycols as a promoter in the anionc catalytic polymerization of lactams, see U.S. Pat. 3,308,099. However, in the process according to the present invention, no use is made of the promoter action of the polyether Furthermore it should be noted that in U.S. Pat. application Ser. No. 22,684, filed Mar. 25, 1970 now Pat. No. 3,704,280 applicants have claimed a similar process which differs from the present process in the promoter used is an isocyanate, containing at least one isocyanate group in the molecule. A condition made in the invention of said application is that in the amount of polyether used, an absolute number of OH groups must be present which is an isocyanate, containing at least one iscyanate group in the quantity of promoter employed. No such limiting factors of this or a smilar nature applies to the process of the present invention.

The invention will be further understood by reference to the following examples including comparative runs of polymerization experiments with caprolactam, with the aid of two different promoters and by addition of different polyethers in various quantities. As an indicator to establish the effect of the present invention the so-called dry Izod-value has been measured. To this end, in each experiment a quantity of 113 grams of caprolactam was polymerized in a flat aluminum mold, producing a sheet (length 15 cm., width 15 cm., thickness of 0.3 cm.). The promoter is dissolved in half the quantity of molten lactam, while in the other half first the catalyst (sodium hydride) and subsequently the polyether is dissolved. The solutions are kept to a temperature of 100° C., and subsequently combined and introduced into the mold which has been kept to 160° C. When the polymerization is terminated, the sheet formed is removed from the mold. The notch impact strength was invariably measured in accordance with the instructions of ASTM D 256–56 on specimens cut off from the sheet.

EXAMPLE 1

Promoter: 1,6-bis(caprolactam N-carbonylamine)hexane, added in a quantity of 0.5 mole percent based on the quantity of caprolactam to be polymerized.

Catalyst: Sodium hydride, added in a quantity of 1.0 mole percent based on the quantity of caprolactam to be polymerized.

| Polyether added, name | Percent by wt. | Izod-value, kg./cm.² |
|---|---|---|
| None | Nil | 3.8 |
| Polypropylene glycol 2000 | 2 | 4.9 |
| Do | 5 | 6.5 |
| Do | 8 | 7.6 |
| Do | 10 | 7.8 |
| Do | 15 | 7.4 |
| Nonyl-phenoxy-polyethylene glycol | 10 | 6.7 |
| Methoxy-nonyl-phenoxy-polyethylene oxide | 10 | 5.7 |

EXAMPLE 2

Promoter: 2,4-bis(caprolactam N-carbonylamine)toluene, added in a quantity of 0.5 mole percent based on the quantity of caprolactam to be polymerized.

Catalyst: Sodium hydride, added in a quantity of 1.0 mole percent, based on the quantity of caprolactam to be polymerized.

| Polyether added, name | Percent by wt. | Izod-value, kg./cm.² |
|---|---|---|
| None | Nil | 4.0 |
| Polypropylene glycol 2000 | 10 | 6.3 |
| Nonyl-phenoxy-polyethylene glycol | 10 | 5.9 |
| Methoxy-nonyl-phenoxy-polyethylene oxide | 10 | 5.9 |

The above examples illustrate that addition of the polyether induces very significant increases in the Izod-value. Other polymer properties of the product were not significantly impaired. Similar results are obtained when other lactams, or other promoters are employed.

What is claimed is:

1. In a process for the anionic catalytic polymerization of lactams, in which a lactam or a mixture of lactams is polymerized with the aid of a promoter consisting of an organic nitrogen compound comprising at least one hydrocarbon radical having from 3 to 12 carbon atoms being an N-substituent of at least one urea, thiourea or guanidine radical, the improvement consisting essentially in that the polymerization is carried out in the presence of from about 2 to about 25% by weight based on the weight of the lactam of a polyether consisting essentially of alkylene units having from 2–5 carbon atoms interconnected by ether bridges and having at least one free hydroxyl end group and having a molecular weight less than 20,000 and which is soluble in the molten lactam or mixture of lactams whereby a polylactam product is obtained having higher Izod-value characteristics.

2. Process according to claim 1, wherein said polyether is a polyoxyalkyleneglycol.

References Cited

UNITED STATES PATENTS

| | | | |
|---|---|---|---|
| 3,308,099 | 3/1967 | Lyon | 260—78 L |
| 3,704,280 | 11/1972 | Loos | 260—77.5 AM |
| 3,304,291 | 2/1967 | Dachs | 260—78 L |
| 3,549,724 | 12/1970 | Okazaki | 260—857 PG |
| 3,514,498 | 5/1970 | Okazaki | 260—857 PG |
| 3,522,329 | 7/1970 | Okazaki | 260—857 PG |

FOREIGN PATENTS

| | | | |
|---|---|---|---|
| 948,507 | 2/1964 | Great Britain | 260—857 PG |

PAUL LIEBERMAN, Primary Examiner

U.S. Cl. X.R.

260—78 A, 830 R, 857 R

UNITED STATES PATENT OFFICE
CERTIFICATE OF CORRECTION

Patent No. 3,793,399                    Dated February 19, 1974

Inventor(s) Jozef L. M. van der Loos and Peter J.M.W. Claassen

It is certified that error appears in the above-identified patent and that said Letters Patent are hereby corrected as shown below:

Column 1, below title of invention, after the inventors' names and addresses should appear --assignors to Stamicarbon N.V., Heerlen, Netherlands--. Column 2, line 32 "is an isocyanate, containing at least one iscyanate group" should read --is greater than the absolute number of isocyanate groups.--. Column 4, the inventor of patent 3,308,099 should be --Mermoud-- rather than "Lyon".

Signed and sealed this 15th day of April 1975.

(SEAL)
Attest:

RUTH C. MASON
Attesting Officer

C. MARSHALL DANN
Commissioner of Patents
and Trademarks